United States Patent
Iyer et al.

(10) Patent No.: US 11,219,086 B2
(45) Date of Patent: Jan. 4, 2022

(54) ENHANCED MACHINE TYPE COMMUNICATIONS QUICK IDLE TRANSITION AFTER CONNECTION RELEASE

(71) Applicant: QUALCOMM Incorporated, San Diego, CA (US)

(72) Inventors: Ashish Shankar Iyer, San Diego, CA (US); Omesh Kumar Handa, San Marcos, CA (US); Chun-Hao Hsu, San Jose, CA (US); Nitin Pant, San Diego, CA (US); Srinivasan Rajagopalan, San Diego, CA (US); Liangchi Hsu, San Diego, CA (US); Feilu Liu, San Diego, CA (US); Muthukumaran Dhanapal, Sunnyvale, CA (US); Alberto Rico Alvarino, San Diego, CA (US); Zhibin Dang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/495,059

(22) PCT Filed: Mar. 23, 2018

(86) PCT No.: PCT/CN2018/080191
§ 371 (c)(1),
(2) Date: Sep. 17, 2019

(87) PCT Pub. No.: WO2018/196522
PCT Pub. Date: Nov. 1, 2018

(65) Prior Publication Data
US 2020/0288531 A1 Sep. 10, 2020

Related U.S. Application Data

(63) Continuation of application No. PCT/CN2017/081949, filed on Apr. 26, 2017.

(51) Int. Cl.
*H04W 76/34* (2018.01)
*H04L 1/18* (2006.01)
*H04W 72/04* (2009.01)

(52) U.S. Cl.
CPC .......... *H04W 76/34* (2018.02); *H04L 1/1812* (2013.01); *H04W 72/042* (2013.01)

(58) Field of Classification Search
CPC .............. H04W 76/34; H04W 72/042; H04W 74/0833; H04W 72/14; H04W 88/06;
(Continued)

(56) References Cited

U.S. PATENT DOCUMENTS 10,104,612 B2 * 10/2018 Chou ................. H04W 52/0216
10,110,644 B2 * 10/2018 Yang .................... H04L 65/1083
(Continued)

FOREIGN PATENT DOCUMENTS

CN 102469519 A 5/2012
CN 102714537 A 10/2012
(Continued)

OTHER PUBLICATIONS

International Search Report and Written Opinion—PCT/CN2018/080191—ISA/EPO—dated Jun. 8, 2018.
(Continued)

*Primary Examiner* — Hanh N Nguyen
(74) *Attorney, Agent, or Firm* — Qualcomm Incorporated

(57) ABSTRACT

Aspects of the present disclosure provide techniques to enable enhanced machine type communication (s) (eMTC) and/or narrowband Internet-of-Things (NB-IoT) devices to transition to idle mode after releasing a connection, such as a radio resource control (RRC) connection, more quickly than with previously known techniques. An example method includes determining, based on an indication received in a narrowband signal on a narrowband region of a bandwidth
(Continued)

comprising a plurality of narrowband regions, whether to wait for a delay period, determined based on a configuration received from a network entity, before releasing a radio resource control (RRC) connection and releasing the RRC connection at a time in accordance with the determination.

18 Claims, 11 Drawing Sheets

(58) Field of Classification Search
CPC ....... H04W 72/00; H04W 76/30; H04W 4/70; H04W 76/27; H04W 76/38; H04W 76/15; H04W 76/19; H04W 76/32; H04L 1/1812; H04L 1/0003; H04L 1/0061; H04L 5/0044; H04L 5/0053; H04L 5/0094
See application file for complete search history.

(56) References Cited

U.S. PATENT DOCUMENTS

| | | | | |
|---|---|---|---|---|
| 10,129,830 | B2* | 11/2018 | Koc | H04B 7/0456 |
| 10,750,380 | B2* | 8/2020 | Fujishiro | H04W 24/02 |
| 2013/0324141 | A1 | 12/2013 | Jung et al. | |
| 2015/0245214 | A1* | 8/2015 | Bellam | H04L 9/0891 |
| | | | | 455/411 |
| 2016/0014815 | A1 | 1/2016 | Vajapeyam et al. | |
| 2017/0048760 | A1* | 2/2017 | Vajapeyam | H04W 36/0055 |
| 2020/0084634 | A1* | 3/2020 | Ohlsson | H04L 63/1458 |

FOREIGN PATENT DOCUMENTS

| | | |
|---|---|---|
| CN | 102972087 A | 3/2013 |
| CN | 103120015 A | 5/2013 |
| CN | 106060967 A | 10/2016 |

OTHER PUBLICATIONS

International Search Report and Written Opinion—PCT/CN2017/081949—ISA/EPO—dated Jan. 18, 2018.
Supplementary European Search Report—EP18790132.7—Search Authority—Berlin—dated Nov. 27, 2020.
"Timer-Based Connection Release", 3GPP Draft, 3GPP TSG-RAN WG2 #92, R2-156504 Timer-Based Connection Release V1, 3rd Generation Partnership Project (3GPP), Mobile Competence Centre, 650, Route Des Lucioles, F-06921 Sophia-Antipolis Cedex, France, vol. RAN WG2. No. Anaheim, USA, Nov. 16, 2015-Nov. 20, 2015, Nov. 16, 2015 (Nov. 16, 2015), XP051005907, 3 Pages, Retrieved from the Internet: URL: http://www.3gpp.org/ftp/Meetings_3GPP_SYNC/RAN2/Docs/, [retrieved on Nov. 16, 2015], the whole document.

* cited by examiner

ENHANCED MACHINE TYPE COMMUNICATIONS QUICK IDLE TRANSITION AFTER CONNECTION RELEASE

This application is a national stage application under 35 U.S.C. 371 of PCT/CN2018/080191, filed Mar. 23, 2018, which claims priority to International Application No. PCT/CN2017/081949 filed Apr. 26, 2017, which are both assigned to the assignee of the present application and are expressly incorporated by reference herein in their entireties.

BACKGROUND

Field of the Disclosure

Certain aspects of the present disclosure generally relate to wireless communications and, more particularly, to quick transitions to idle mode by enhanced machine type communication(s) (eMTC) and/or narrowband Internet-of-Things (NB-IoT) devices after releasing a connection, such as a radio resource control (RRC) connection.

Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced (LTE-A) systems and orthogonal frequency division multiple access (OFDMA) systems.

Generally, a wireless multiple-access communication system can simultaneously support communication for multiple wireless terminals. Each terminal communicates with one or more base stations (BSs) via transmissions on the forward and reverse links. The forward link (or downlink) refers to the communication link from the BSs to the terminals, and the reverse link (or uplink) refers to the communication link from the terminals to the BSs. This communication link may be established via a single-input single-output, multiple-input single-output or a multiple-input multiple-output (MIMO) system.

A wireless communication network may include a number of BSs that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Wireless devices may include narrowband Internet-of-Things (NB-IoT) devices. IoT may refer to a network of physical objects, devices, or "things". IoT devices may be embedded with, for example, electronics, software, or sensors and may have network connectivity, which enable these devices to collect and exchange data.

Some next generation, NR, or 5G networks may include a number of base stations, each simultaneously supporting communication for multiple communication devices, such as UEs. In LTE or LTE-A network, a set of one or more BSs may define an e NodeB (eNB). In other examples (e.g., in a next generation or 5G network), a wireless multiple access communication system may include a number of distributed communication units (e.g., edge units (EUs), edge nodes (ENs), radio heads (RHs), smart radio heads (SRHs), transmission reception points (TRPs), etc.) in communication with a number of central units (e.g., CU, central nodes (CNs), access node controllers (ANCs), etc.), where a set of one or more distributed units (DUs), in communication with a CU, may define an access node (e.g., AN, a new radio base station (NR BS), a NR NB, a network node, a gNB, a 5G BS, an access point (AP), etc.). A BS or DU may communicate with a set of UEs on downlink channels (e.g., for transmissions from a BS or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, MIMO antenna technology, and carrier aggregation.

However, as the demand for mobile broadband access continues to increase, there exists a need for further improvements in LTE, MTC, IoT, and NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between access points and stations in a wireless network.

Certain aspects of the present disclosure generally relate to quick transitions to idle mode by enhanced machine type communication(s) (eMTC) and/or narrowband Internet-of-Things (NB-IoT) devices after releasing a connection, such as a radio resource control (RRC) connection.

Certain aspects of the present disclosure provide a method for wireless communications by a user equipment (UE). The method generally includes determining, based on an indication received in a narrowband signal on a narrowband region of a bandwidth comprising a plurality of narrowband regions, whether to wait for a delay period, determined based on a configuration received from a network entity, before releasing a radio resource control (RRC) connection and releasing the RRC connection at a time in accordance with the determination.

Certain aspects of the present disclosure provide an apparatus for wireless communications. The apparatus generally includes a processor configured to determine, based on an indication received in a narrowband signal on a narrowband region of a bandwidth comprising a plurality of narrowband regions, whether to wait for a delay period, determined based on a configuration received from a network entity, before releasing a radio resource control (RRC) connection and to cause the apparatus to release the RRC connection at a time in accordance with the determination, and a memory coupled with the processor.

Certain aspects of the present disclosure provide an apparatus for wireless communications. The apparatus generally includes means for determining, based on an indication received in a narrowband signal on a narrowband region of a bandwidth comprising a plurality of narrowband regions, whether to wait for a delay period, determined based on a configuration received from a network entity, before releasing a radio resource control (RRC) connection and means for releasing the RRC connection at a time in accordance with the determination.

Certain aspects of the present disclosure provide computer-readable medium for wireless communications including instructions. The instructions, when executed by a processor, cause the processor to perform operations generally including determining, based on an indication received in a narrowband signal on a narrowband region of a bandwidth comprising a plurality of narrowband regions, whether to wait for a delay period, determined based on a configuration received from a network entity, before releasing a radio resource control (RRC) connection and releasing the RRC connection at a time in accordance with the determination Numerous other aspects are provided including methods, apparatus, systems, computer program products, computer-readable medium, and processing systems capable of performing the operations described above. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide techniques to enable enhanced machine type communication(s) (eMTC) and/or narrowband Internet-of-Things (NB-IoT) devices to transition to idle mode after releasing a connection, such as a radio resource control (RRC) connection, more quickly than with previously known techniques. Devices using previously known techniques may wait for a period of ten seconds after receiving a radio resource control connection release (RRCConnectionRelease) command before transitioning to an idle mode (e.g., RRC-Idle mode). According to aspects of the present disclosure, a device may transition to an idle mode more quickly and save some power, possibly extending battery life of the device.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, 1S-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. Certain aspects of the techniques are described below for LTE/LTE-Advanced (LTE-A), and LTE/LTE-A terminology is used in much of the description below. LTE and LTE-A are referred to generally as LTE.

It is noted that while aspects may be described herein using terminology commonly associated with 3G and/or 4G wireless technologies, aspects of the present disclosure can be applied in other generation-based communication systems, such as 5G and later.

Figure 1:
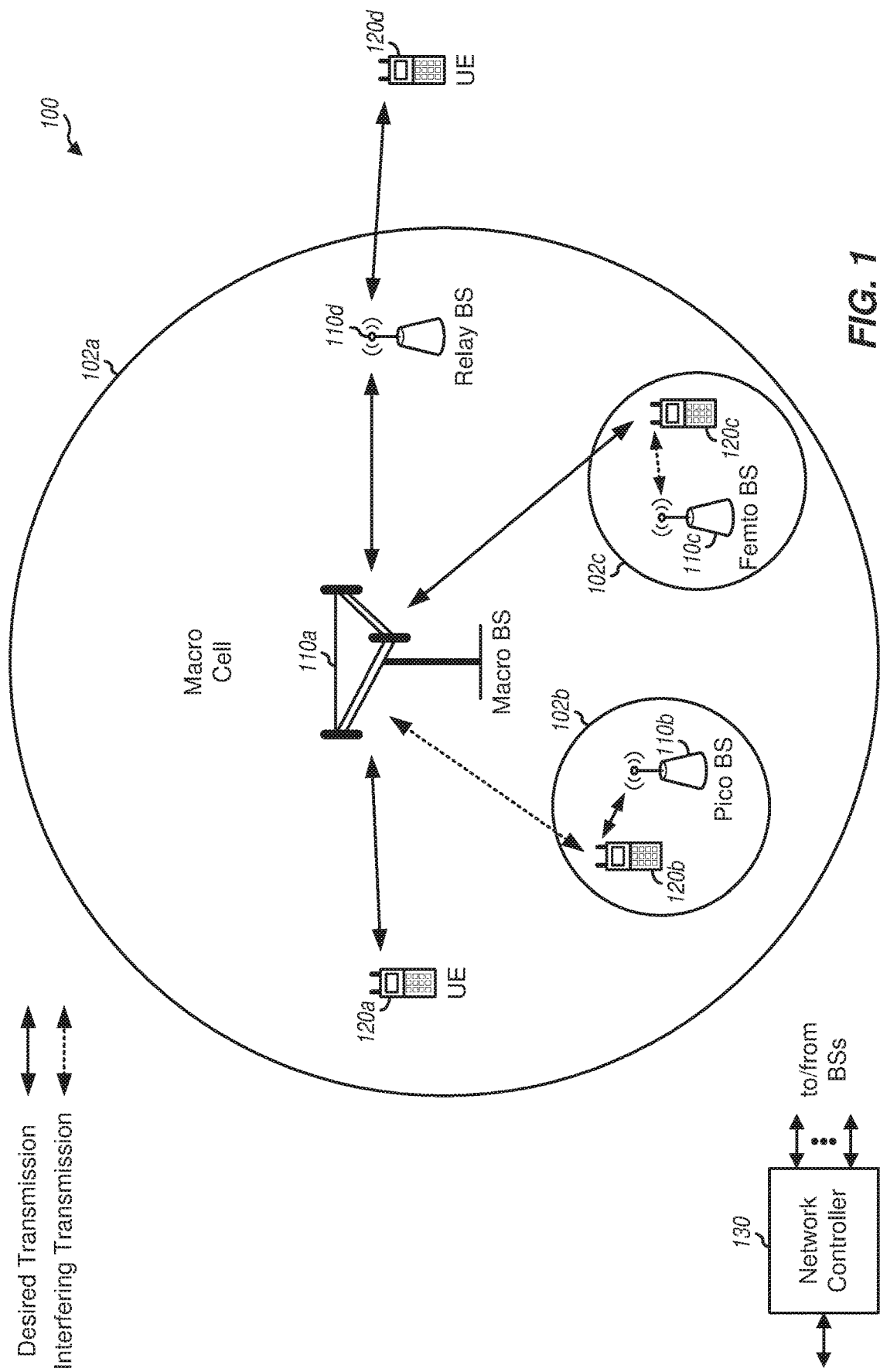
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used for determining and/or signaling presence and/or bandwidth of reference signals (RS) in narrowband systems, such as enhanced/evolved machine type communication(s) (eMTC) and/or narrowband internet-of-things (NB-IoT).

For example, wireless communication network 100 may include base stations (BS) 110 and user equipment (UEs) 120. In aspects, a BS 110 can determine presence of RS in a subframe and/or the bandwidth of the RS. BS 110 can transmit the RS in the subframe in at least the determined bandwidth. UE 120, which may be an eMTC device, low cost UE, or NB-IoT device, can determine the presence of the RS in the subframe and/or the bandwidth of the RS and monitor (decode/receive) for the RS in the subframe based on the determination.

Wireless communication network 100 may be a long term evolution (LTE) network or some other wireless network, such as a new radio (NR) or 5G access network. Wireless communication network 100 may include a number of BSs 110 and other network entities. A BS is an entity that communicates with UEs and may also be referred to as a Node B (NB), an enhanced/evolved NB (eNB), a gNB, a 5G NB, an access point (AP), NR BS, transmission reception point (TRP), etc. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)), n BS for a macro cell may be referred to as a macro BS. A BS for a pico cell may be referred to as a pico BS. A BS for a femto cell may be referred to as a femto BS or a home BS. In the example shown in FIG. 1, BS 110a may be a macro BS for a macro cell 102a, BS 110b may be a pico BS for a pico cell 102b, and BS 110c may be a femto BS for a femto cell 102c. A BS may support one or multiple (e.g., three) cells. The terms "base station" and "cell" may be used interchangeably herein.

Wireless communication network 100 may also include relay stations. A relay station is an entity that can receive a transmission of data from an upstream station (e.g., BS 110 or a UE 120) and send a transmission of the data to a downstream station (e.g., UE 120 or BS 110). A relay station may also be a UE that can relay transmissions for other UEs. In the example shown in FIG. 1, relay station 110d may communicate with macro BS 110a and UE 120d in order to facilitate communication between BS 110a and UE 120d. A relay station may also be referred to as a relay eNB, a relay BS, a relay, etc.

Wireless communication network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless communication network 100. For example, macro BSs may have a high transmit power level (e.g., 5 to 40 Watts) whereas pico BSs, femto BSs, and relay BSs may have lower transmit power levels (e.g., 0.1 to 2 Watts).

Network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., UE 120a, UE 120b, UE 120c) may be dispersed throughout wireless communication network 100, and each UE may be stationary or mobile. A UE may also be referred to as an access terminal, a terminal, a mobile station, a subscriber unit, a station, a Customer Premises Equipment (CPE), etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, medical equipment, a biometric sensor/device, a wearable device such as a smart watch, smart clothing, smart glasses, a smart wristband, and/or smart jewelry (e.g., a smart ring, a smart bracelet, etc.), an entertainment device (e.g., a music device, a video device, a satellite radio, etc.), industrial manufacturing equipment, a global positioning system (GPS) device, or any other suitable device configured to communicate via a wireless or wired medium. Some UEs may be considered machine-type communication (MTC) devices or enhanced/evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

One or more UEs 120 in the wireless communication network 100 (e.g., an LTE network) may be a narrowband bandwidth UE (e.g., eMTC and/or NB-IoT UEs). As used herein, devices with limited communication resources, e.g. smaller bandwidth, may be referred to generally as narrowband UEs. Similarly, legacy devices, such as legacy and/or advanced UEs (e.g., in LTE) may be referred to generally as wideband UEs. Generally, wideband UEs are capable of operating on a larger amount of bandwidth than narrowband UEs.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases. NR or 5G RAT networks may be deployed.

In some examples, access to the air interface may be scheduled, wherein a scheduling entity (e.g., a BS 110) allocates resources for communication among some or all devices and equipment within its service area or cell. The scheduling entity may be responsible for scheduling, assigning, reconfiguring, and releasing resources for one or more subordinate entities. For scheduled communication, subordinate entities utilize resources allocated by the scheduling entity. BSs 110 are not the only entities that may function as a scheduling entity. In some examples, UE 120 may function as a scheduling entity, scheduling resources for one or more subordinate entities (e.g., one or more other UEs 120). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example. UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
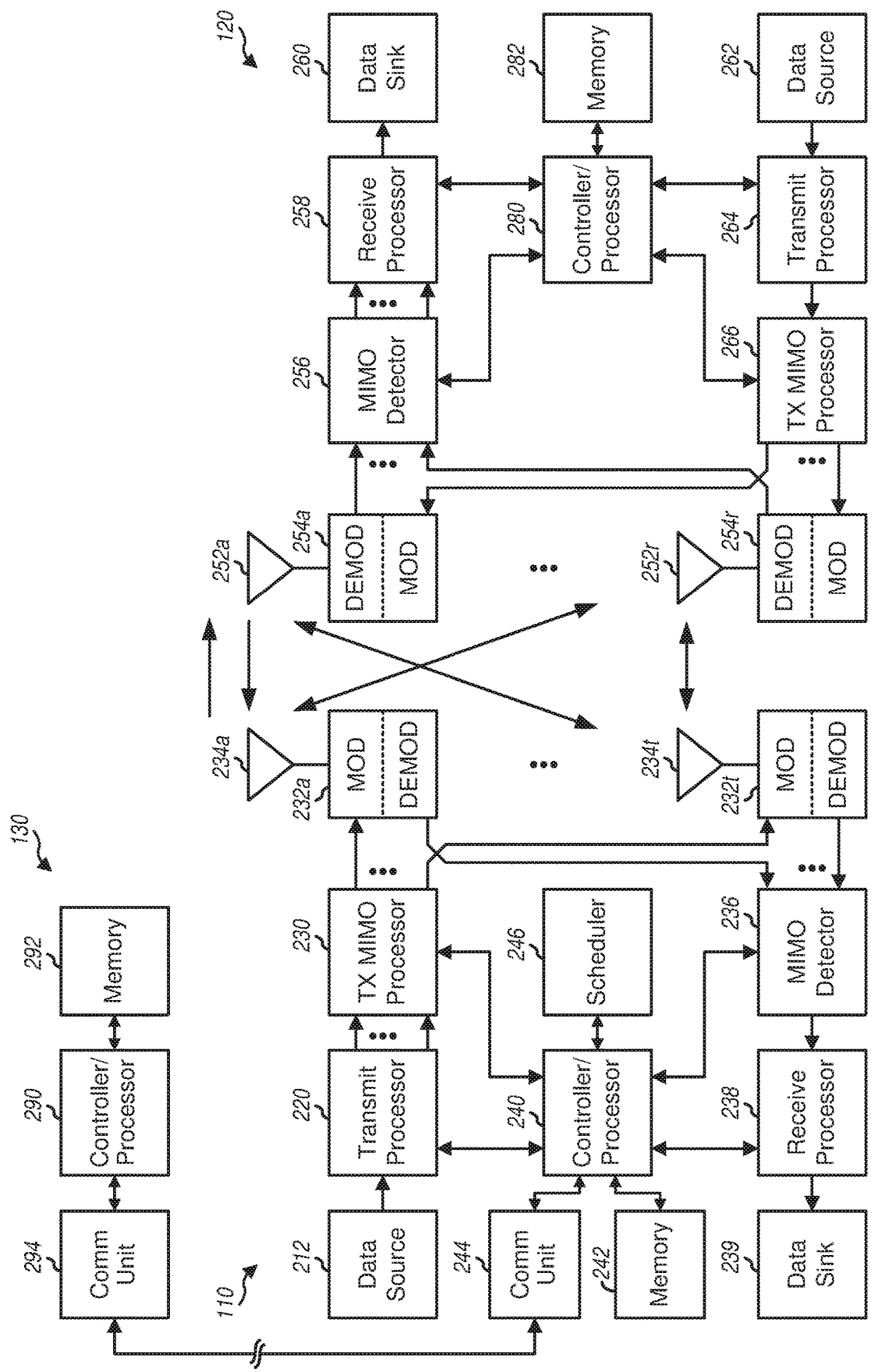
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of BS 110 and UE 120, which may be one of the BSs and one of the UEs shown in FIG. 1. BS 110 may be equipped with T antennas 234a through 234t, and UE 120 may be equipped with R antennas 252a through 252r, where in general T≥1 and R≥1.

At BS 110, transmit processor 220 may receive data from data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for static resource partitioning information (SRPI), etc.) and control information (e.g., CQI requests, grants, upper layer signaling, etc.) and provide overhead symbols and control symbols. Processor 220 may also generate reference symbols for reference signals (e.g., the cell-specific reference signal (CRS)) and synchronization signals (e.g., the primary synchronization signal (PSS) and secondary synchronization signal (SSS)). Transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from BS 110 and/or other BSs and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. MIMO detector 256 may obtain received symbols from all R demodulators 254a through 254r, perform MIMO detection on the received symbols if applicable, and provide detected symbols. Receive processor 258 may process (e.g., demodulate and decode) the detected symbols, provide decoded data for UE 120 to data sink 260, and provide decoded control information and system information to controller/processor 280. A channel processor may determine reference signal received power (RSRP), receive signal strength indicator (RSSI), reference signal received quality (RSRQ), CQI, etc.

On the uplink, at UE 120, transmit processor 264 may receive and process data from data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by TX MIMO processor 266 if applicable, further processed by modulators 254a through 254r (e.g., for SC-FDM, OFDM, etc.), and transmitted to BS 110. At BS 110, the uplink signals from UE 120 and other UEs may be received by antennas 234, processed by demodulators 232, detected by MIMO detector 236 if applicable, and further processed by receive processor 238 to obtain decoded data and control information sent by UE 120. Processor 238 may provide the decoded data to data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 may direct the operation at BS 110 and UE 120, respectively, to perform techniques presented herein. For example, processor 240 and/or other processors and modules at BS 110, and processor 280 and/or other processors and modules at UE 120, may perform or direct operations of BS 110 and UE 120, respectively. For example, controller/processor 280 and/or other controllers/processors and modules at UE 120, and/or controller/processor 240 and/or other controllers/processors and modules at BS 110 may perform or direct operations 1100 and 1200 shown in FIGS. 11 and 12, respectively. Memories 242 and 282 may store data and program codes for BS 110 and UE 120, respectively. Scheduler 246 may schedule UEs for data transmission on the downlink and/or uplink.

Figure 3:
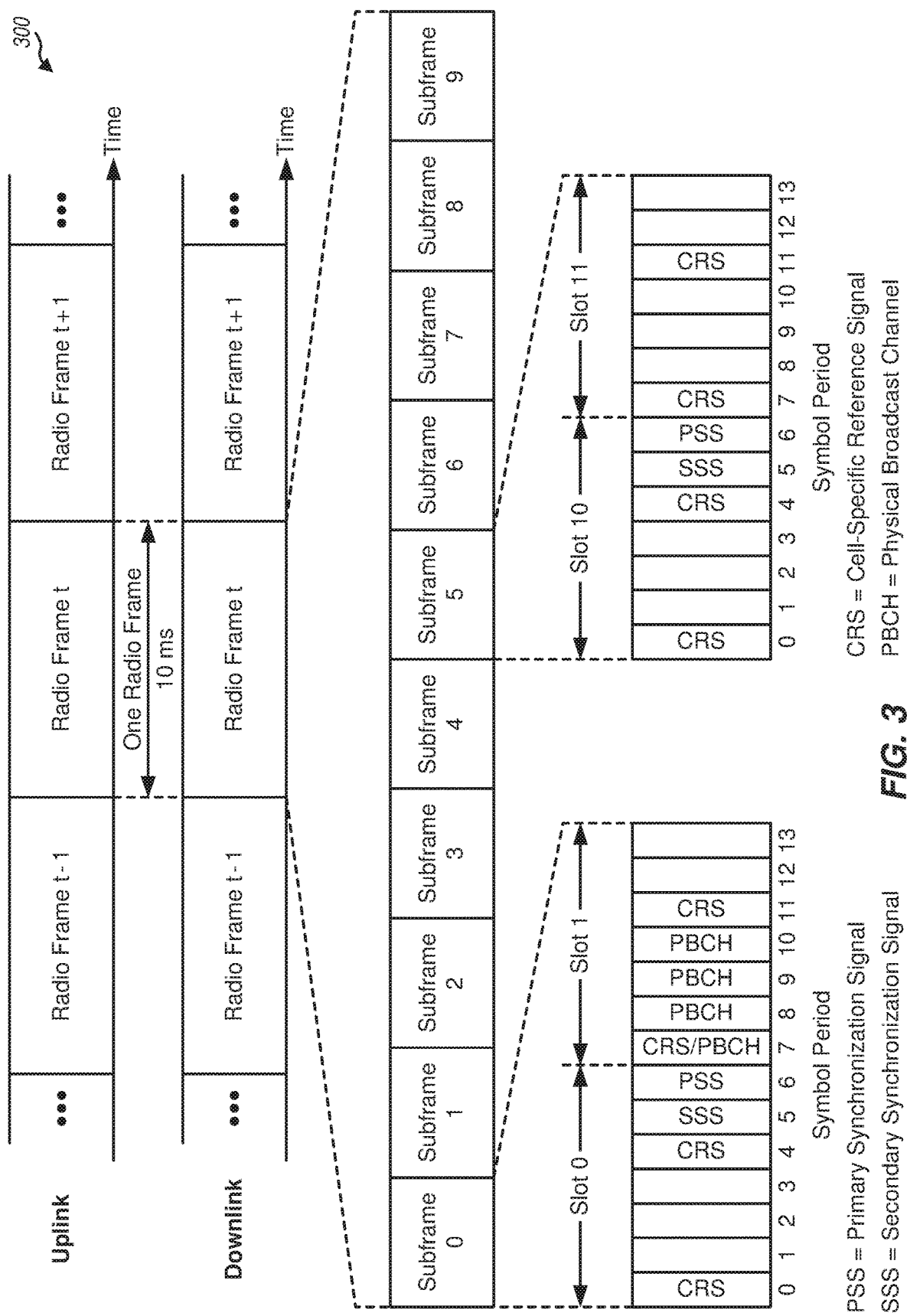
FIG. 3 is a block diagram conceptually illustrating an example of a frame structure in a wireless communications network, in accordance with certain aspects of the present disclosure.

FIG. 3 shows an exemplary frame structure 300 for frequency division duplexing (FDD) in a wireless communication systems (e.g., such as wireless communication network 100). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, for example, seven symbol periods for a normal cyclic prefix (as shown in FIG. 3) or six symbol periods for an extended cyclic prefix. The 2L symbol periods in each subframe may be assigned indices of 0 through 2L−1.

In certain wireless communication systems (e.g., LTE), a BS may transmit a PSS and a SSS on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a CRS across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In certain systems (e.g., such as NR or 5G systems), a BS may transmit these or other signals in these locations or in different locations of the subframe.

Figure 4:
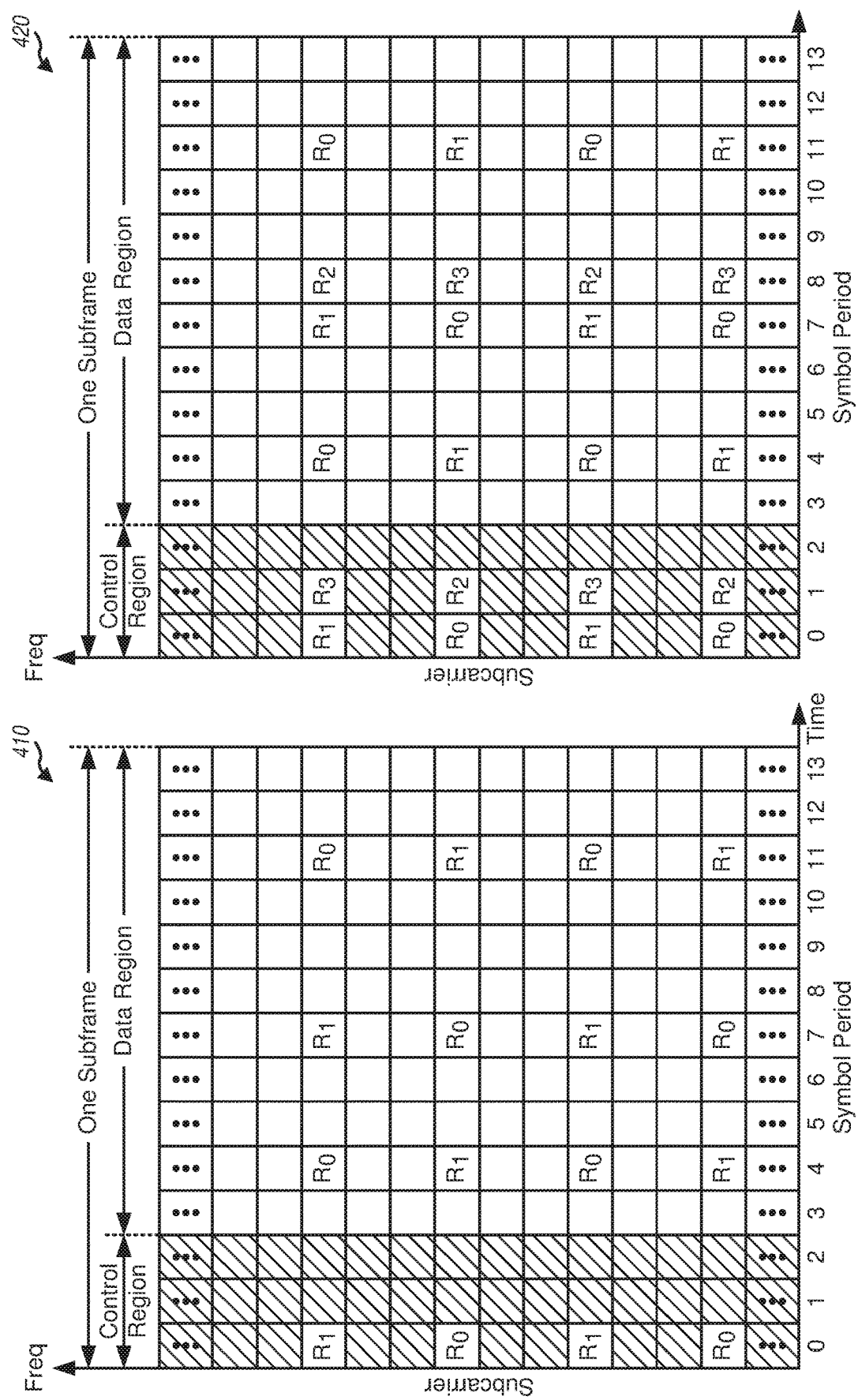
FIG. 4 is a block diagram conceptually illustrating two exemplary subframe formats with the normal cyclic prefix, in accordance with certain aspects of the present disclosure.

FIG. 4 shows two exemplary subframe formats 410 and 420 with the normal cyclic prefix. The available time frequency resources may be partitioned into resource blocks (RBs). Each RB may cover 12 subcarriers in one slot and may include a number of resource elements (RE). Each RE may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given RE with label Ra, a modulation symbol may be transmitted on that RE from antenna a, and no modulation symbols may be transmitted on that RE from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, REs not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD (e.g., in LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q ∈ {0, . . . , Q−1}.

The wireless communication network (e.g., wireless communication network 100) may support hybrid automatic retransmission request (HARQ) for data transmission on the downlink and uplink. For HARQ, a transmitter (e.g., a BS such as a BS 110) may send one or more transmissions of a packet until the packet is decoded correctly by a receiver (e.g., a UE such as a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a RSRQ, or some other metric. The UE may operate in a dominant interference scenario in which the UE may observe high interference from one or more interfering BS.

The wireless communication network may support a 180 kHz deployment for narrowband operation, such as narrowband internet of things (NB-IoT) and/or narrowband enhanced/evolved machine type communication(s) (eMTC) with different deployment modes. In one example, narrowband operations may be deployed in-band, for example, using resource blocks (RBs) within a wider system bandwidth. In one case, narrowband operations may use one RB within the wider system bandwidth of an existing network, for example, such as a long term evolution (LTE) network. In this case, the 180 kHz bandwidth for the RB may have to be aligned with a wideband RB. In one example, narrowband operations may be deployed in the unused RBs within a carrier guard-band (e.g., LTE). In this deployment, the 180 kHz RB within the guard band may be aligned with a 15 kHz tone grid of wideband LTE, for example, in order to use the same Fast Fourier Transform (FFT) and/or reduce interference in-band legacy LTE communications.

The focus of traditional LTE design (e.g., for legacy "non-MTC" and/or "non-IoT" devices) is on the improvement of spectral efficiency, ubiquitous coverage, and enhanced quality of service (QoS) support. Current LTE system downlink and uplink link budgets are designed for coverage of high end devices, such as state-of-the-art smartphones and tablets, which may support a relatively large downlink and uplink link budget.

However, as described above, one or more UEs in the wireless communication network (e.g., wireless communication network 100) may be low cost devices that have limited communication resources, such as narrowband UEs, as compared to other (wideband) devices in the wireless communication network. For narrowband UEs, various requirements may be relaxed as only a limited amount of information may need to be exchanged. For example, maximum bandwidth may be reduced (relative to wideband UEs), a single receive radio frequency (RF) chain may be used, peak rate may be reduced (e.g., a maximum of 100 bits for a transport block size), transmit power may be reduced. Rank 1 transmission may be used, and half-duplex operation may be performed.

In some cases, if half-duplex operation is performed, MTC UEs may have a relaxed switching time to transition from transmitting to receiving (or receiving to transmitting). For example, the switching time may be relaxed from 20 μs for regular UEs to 1 ms for MTC UEs. Release 12 MTC UEs may still monitor downlink control channels in the same way as regular UEs, for example, by monitoring for wideband control channels in the first few symbols (e.g., the physical downlink control channel (PDCCH)) as well as narrowband control channels occupying a relatively narrowband, but spanning a length of a subframe (e.g., enhanced PDCCH (ePDCCH)).

Certain standards (e.g., LTE Release 13) may introduce support for various additional MTC enhancements, referred to herein as evolved/enhanced MTC (eMTC). For example, eMTC may provide UEs with coverage enhancements up to 15 dB.

Figure 5:
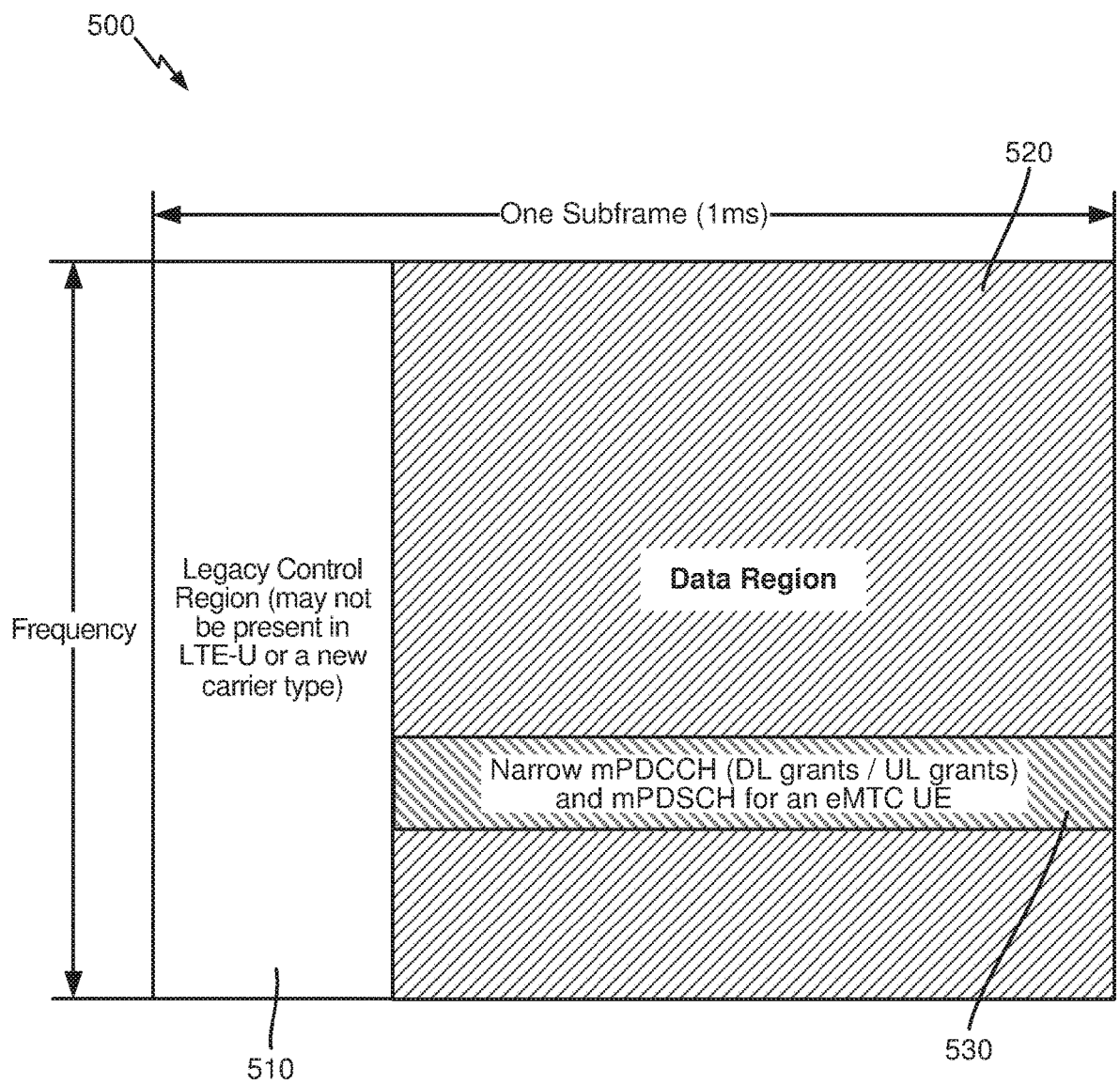
FIG. 5 illustrates an exemplary subframe configuration for enhanced/evolved machine type communications (eMTC), in accordance with certain aspects of the present disclosure.

As illustrated in the subframe structure 500 of FIG. 5, eMTC UEs can support narrowband operation while operating in a wider system bandwidth (e.g., 1.4/3/5/10/15/20 MHz). In the example illustrated in FIG. 5, a conventional legacy control region 510 may span system bandwidth of a first few symbols, while a narrowband region 530 of the system bandwidth (spanning a narrow portion of a data region 520) may be reserved for an MTC PDCCH (MPDCCH) and for an MTC physical downlink shared channel (MPDSCH). In some cases, an (e)MTC UE monitoring the narrowband region may operate at 1.4 MHz or 6 RBs. The MPDCCH may rely on demodulation reference signal (DMRS) demodulation. Coverage may be increased by performing repetition/bundling of signals.

However, as noted above, eMTC UEs may be able to operate in a cell with a bandwidth larger than 6 RBs. Within this larger bandwidth, each eMTC UE may still operate (e.g., monitor/receive/transmit) while abiding by a 6-PRB constraint. In some cases, different eMTC UEs may be served by different narrowband regions (e.g., with each spanning 6-PRB blocks). Because the system bandwidth may span from 1.4 MHz to 20 MHz, or from 6 RBs to 100 RBs, multiple narrowband regions may exist within the larger bandwidth. An eMTC UE may switch or hop between multiple narrowband regions in order to reduce interference.

The Internet-of-Things (IoT) may refer to a network of physical objects, devices, or "things". IoT devices may be embedded with, for example, electronics, software, or sensors and may have network connectivity, which enable these devices to collect and exchange data. IoT devices may be sensed and controlled remotely across existing network infrastructure, creating opportunities for more direct integration between the physical world and computer-based systems and resulting in improved efficiency, accuracy, and economic benefit. Systems that include IoT devices augmented with sensors and actuators may be referred to cyber-physical systems. Cyber-physical systems may include technologies such as smart grids, smart homes, intelligent transportation, and/or smart cities. Each "thing" (e.g., IoT device) may be uniquely identifiable through its embedded computing system may be able to interoperate within existing infrastructure, such as Internet infrastructure.

Certain wireless communication systems (e.g., wireless communication network 100), such as Release 13 eMTC systems), may support narrowband IoT (NB-IoT) operation. NB-IoT may refer to a narrowband radio technology designed for IoT. NB-IoT may focus on indoor coverage, low cost, long batter life, and large number of devices. To reduce the complexity of UEs, NB-IoT may allow for narrowband deployments utilizing one PRB (e.g., 180 kHz+ 20 kHz guard band).

NB-IoT may offer standalone, in-band, or guard band deployment scenarios. Standalone deployment may use new bandwidth, whereas guard band deployment may be done using bandwidth typically reserved in the guard band of an existing network, such as long term evolution (LTE). In-band deployment on the other hand may use the same resource blocks in the LTE carrier of the existing LTE network. NB-IoT may offer increased coverage. NB-IoT may define a new narrowband control channel (e.g., NPDCCH), data (e.g., PDSCH), and references signals (e.g., NRS) that fit in 1 RB.

Figure 6:
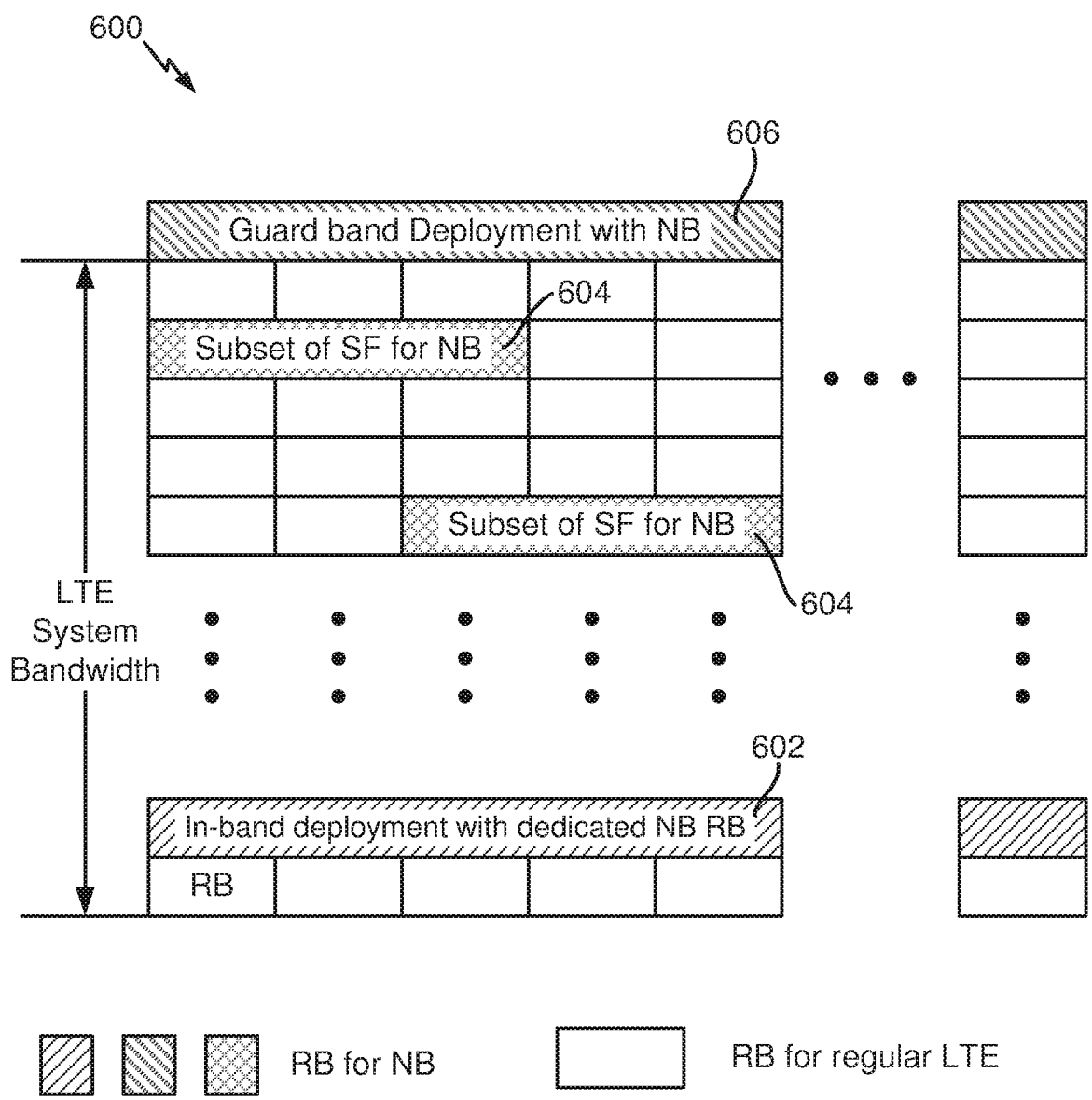
FIG. 6 illustrates an example deployment of narrowband Internet-of-Things (NB-IoT), in accordance with certain aspects of the present disclosure.

FIG. 6 illustrates an example deployment 600 of NB-IoT, according to certain aspects of the present disclosure. Three NB-IoT deployment configurations include in-band, guard-band, and standalone. For the in-band deployment configuration, NB-IoT may coexist with a legacy system (e.g., GSM, WCDMA, and/or LTE system(s)) deployed in the same frequency band. For example, the wideband LTE channel may be deployed in various bandwidths between 1.4 MHz to 20 MHz. As shown in FIG. 6, a dedicated RB 602 within that bandwidth may be available for use by NB-IoT and/or the RBs 1204 may be dynamically allocated for NB-IoT. As shown in FIG. 6, in an in-band deployment, one RB, or 200 kHz, of a wideband channel (e.g., LTE) may be used for NB-IoT.

Certain systems (e.g., LTE) may include unused portions of the radio spectrum between carriers to guard against interference between adjacent carriers. In some deployments, NB-IoT may be deployed in a guard band 606 of the wideband channel.

In other deployments, NB-IoT may be deployed standalone (not shown). In a standalone deployment, one 200 kHz carrier may be utilized to carry NB-IoT traffic and GSM spectrum may be reused.

Deployments of NB-IoT may include synchronization signals such as PSS for frequency and timing synchronization and SSS to convey system information. For NB-IoT operations, PSS/SSS timing boundaries may be extended as compared to the existing PSS/SSS frame boundaries in legacy systems (e.g., LTE), for example, from 10 ms to 40 ms. Based on the timing boundary, a UE is able to receive a PBCH transmission, which may be transmitted in subframe 0 of a radio frame.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a CP on the uplink and downlink and include support for half-duplex operation using TDD. NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC) service.

A single component carrier (CC) bandwidth of 100 MHZ may be supported. NR RBs may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 9 and 10.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units (CUs) or distributed units (DUs).

The NR RAN may include a CU and DUs. A NR BS (e.g., a NB, an eNB, a gNB, a 5G NB, a TRP, an AP, etc.) may correspond to one or multiple BSs. NR cells can be configured as access cells (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit synchronization signals.

Figure 7:
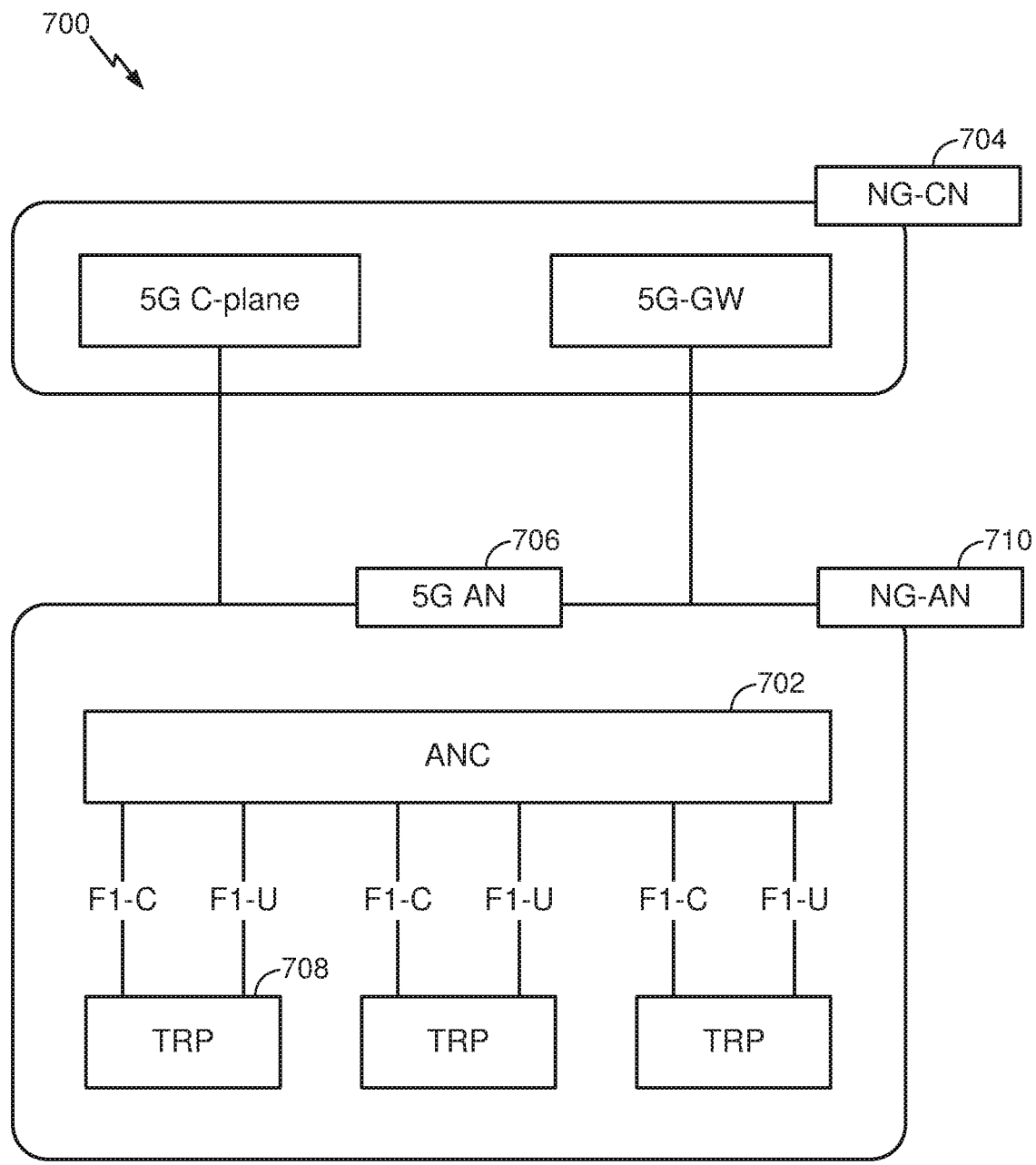
FIG. 7 illustrates an example logical architecture of a distributed radio access network (RAN), in accordance with certain aspects of the present disclosure.

FIG. 7 illustrates an example logical architecture 700 of a distributed RAN, according to aspects of the present disclosure. 50 access node 706 may include access node controller (ANC) 702. ANC 702 may be a CU of the distributed RAN. The backhaul interface to the next generation core network (NG-CN) 704 may terminate at ANC 702. The backhaul interface to neighboring next generation access nodes (NG-ANs) 710 may terminate at ANC 702. ANC 702 may include one or more TRPs 708. As described above, TRP may be used interchangeably with "cell", BS, NR BS, NB, eNB, 5G NB, gNB, AP, etc.

TRPs 708 may comprise a DU. TRPs 708 may be connected to one ANC (e.g., ANC 702) or more than one ANC (not illustrated). For example, for RAN sharing, radio as a service (RaaS), and service specific AND deployments, TRP 708 may be connected to more than one ANC. TRP 708 may include one or more antenna ports. TRPs 708 may be configured to individually (e.g., dynamic selection) or jointly (e.g., joint transmission) serve traffic to a UE.

Logical architecture 700 may be used to illustrate fronthaul definition. The architecture may be defined that support fronthauling solutions across different deployment types. For example, logical architecture 700 may be based on transmit network capabilities (e.g., bandwidth, latency, and/or jitter). Logical architecture 700 may share features and/or components with LTE. According to aspects, NG-AN 710 may support dual connectivity with NR. NO-AN 710 may share a common fronthaul for LTE and NR. Logical architecture 700 may enable cooperation between and among TRPs 708. For example, cooperation may be preset within a TRP and/or across TRPs via ANC 702. In some cases, no inter-TRP interface may be needed/present.

A dynamic configuration of split logical functions may be present within logical architecture 700. The packet data convergence protocol (PDCP), radio link control (RLC), and medium access control (MAC) protocols may be adaptably placed at ANC 702 or TRP 708.

Figure 8:
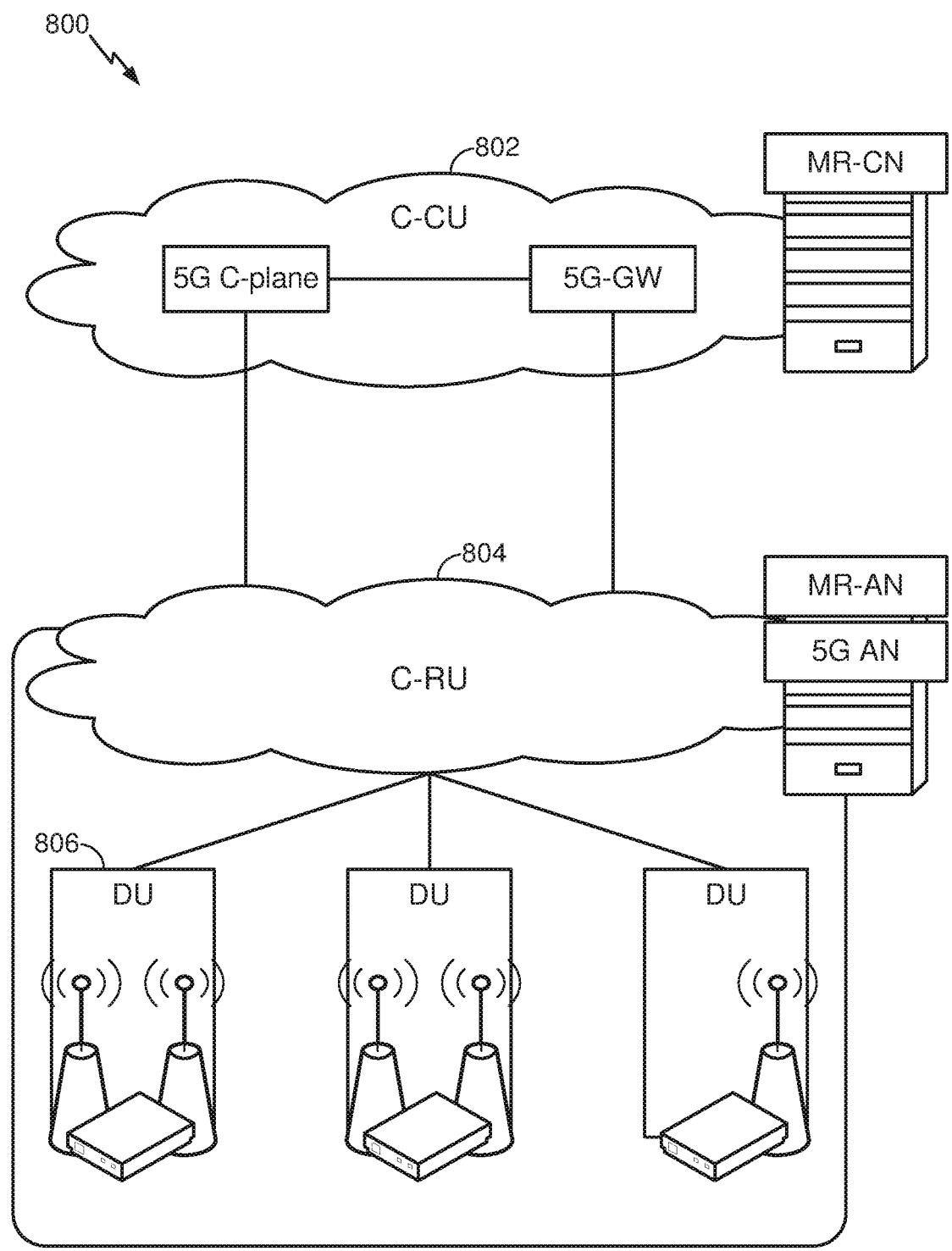
FIG. 8 illustrates an example physical architecture of a distributed RAN, in accordance with certain aspects of the present disclosure.

FIG. 8 illustrates an example physical architecture 800 of a distributed RAN, according to aspects of the present disclosure. Centralized core network unit (C-CU) 802 may host core network functions. C-CU 802 may be centrally deployed. C-CU 802 functionality may be offloaded (e.g., to advanced wireless services (AWS)), in an effort to handle peak capacity.

Centralized RAN unit (C-RU) 804 may host one or more ANC functions. Optionally, C-RU 804 may host core network functions locally. C-RU 804 may have distributed deployment. C-RU 804 may be closer to the network edge.

DU 806 may host one or more TRPs. DU 806 may be located at edges of the network with radio frequency (RF) functionality.

Figure 9:
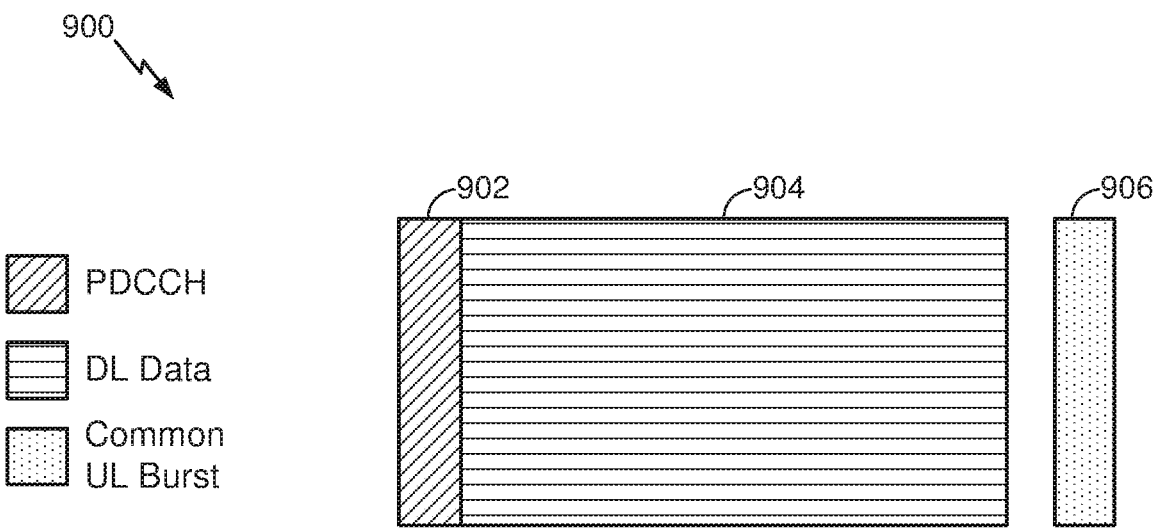
FIG. 9 is a diagram illustrating an example of a downlink (DL)-centric subframe, in accordance with certain aspects of the present disclosure.

FIG. 9 is a diagram showing an example of a DL-centric subframe 900. DL-centric subframe 900 may include control portion 902. Control portion 902 may exist in the initial or beginning portion of DL-centric subframe 900. Control portion 902 may include various scheduling information and/or control information corresponding to various portions of DL-centric subframe 900. In some configurations, control portion 902 may be a physical DL control channel (PDCCH), as shown in FIG. 9. DL-centric subframe 900 may also include DL data portion 904. DL data portion 904 may sometimes be referred to as the payload of DL-centric subframe 900. DL data portion 904 may include the communication resources utilized to communicate DL data from the scheduling entity (e.g., UE or BS) to the subordinate entity (e.g., UE). In some configurations, DL data portion 904 may be a physical DL shared channel (PDSCH).

DL-centric subframe 900 may also include common UL portion 906. Common UL portion 906 may sometimes be referred to as an UL burst, a common UL burst, and/or various other suitable terms. Common UL portion 906 may include feedback information corresponding to various other portions of DL-centric subframe 900. For example, common UL portion 906 may include feedback information corresponding to control portion 902. Non-limiting examples of feedback information may include an acknowledgment (ACK) signal, a negative acknowledgment (NACK) signal, a HARQ indicator, and/or various other suitable types of information. Common UL portion 906 may include additional or alternative information, such as information pertaining to random access channel (RACH) procedures, scheduling requests (SRs), and various other suitable types of information. As illustrated in FIG. 9, the end of DL data portion 904 may be separated in time from the beginning of common UL portion 906. This time separation may sometimes be referred to as a gap, a guard period, a guard interval, and/or various other suitable terms. This separation provides time for the switch-over from DL communication (e.g., reception operation by the subordinate entity) to UL communication (e.g., transmission by the subordinate entity). One of ordinary skill in the art will understand that the foregoing is merely one example of a DL-centric subframe and alternative structures having similar features may exist without necessarily deviating from the aspects described herein.

Figure 10:
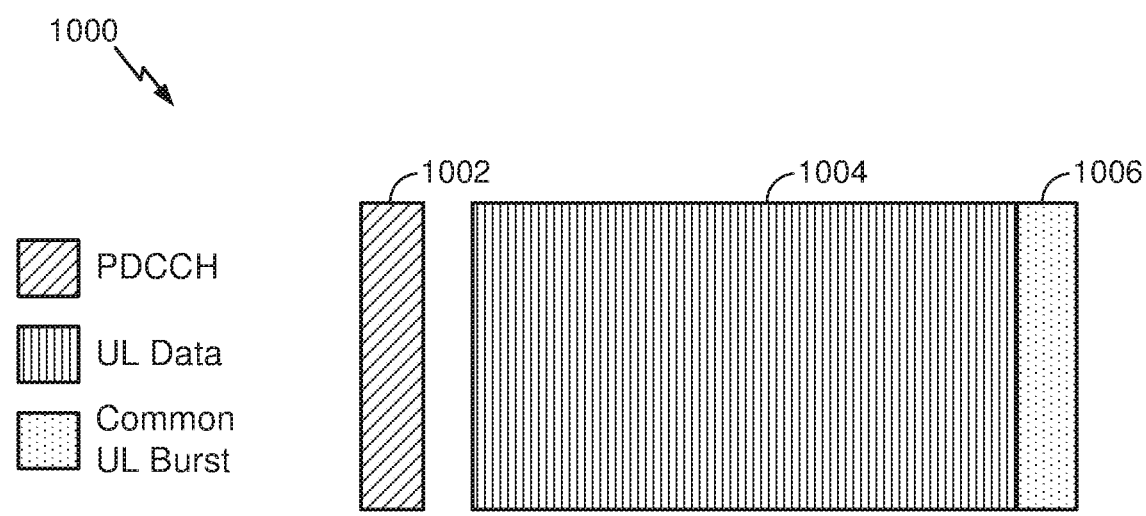
FIG. 10 is a diagram illustrating an example of an uplink (UL)-centric subframe, in accordance with certain aspects of the present disclosure.

FIG. 10 is a diagram showing an example of UL-centric subframe 1000. UL-centric subframe 1000 may include control portion 1002. Control portion 1002 may exist in the initial or beginning portion of UL-centric subframe 1000. Control portion 1002 in FIG. 10 may be similar to control portion 1002 described above with reference to FIG. 9. UL-centric subframe 1000 may also include UL data portion 1004. UL data portion 1004 may sometimes be referred to as the payload of UL-centric subframe 1000. The UL portion may refer to the communication resources utilized to communicate UL data from the subordinate entity (e.g., UE) to the scheduling entity (e.g., UE or BS). In some configurations, control portion 1002 may be a PDCCH. In some configurations, the data portion may be a physical uplink shared channel (PUSCH).

As illustrated in FIG. 10, the end of control portion 1002 may be separated in time from the beginning of UL data portion 1004. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). UL-centric subframe 1000 may also include common UL portion 1006. Common UL portion 1006 in FIG. 10 may be similar to common UL portion 906 described above with reference to FIG. 9. Common UL portion 1006 may additionally or alternatively include information pertaining to CQI, sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a RRC dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Enhanced Machine Type Communications Quick Idle Transition after Connection Release According to previously known techniques, an enhanced machine type communications (eMTC) or narrowband Internet of Things (NB-IoT) device that receives an NB-IOT—EMTC RRC Connection Release (RRCConnectionRelease) command may wait an extended time (e.g., ten seconds) after receiving the command before transitioning to an idle (e.g., radio resource connection idle (RRC-idle) state.

In previously known specifications for NB-IoT communications, after a device (e.g., a UE) receives an RRCConnectionRelease message (e.g., from a base station (BS)), the device delays going to an idle state for ten seconds from the moment the RRCConnectionRelease message was received, or optionally, the device goes to the idle state when lower layers (e.g., a physical layer (PHY), a radio link control (RLC) layer) of a communications protocol stack of the device indicate that receipt of the RRCConnectionRelease message has been successfully acknowledged, whichever is earlier.

According to previously known techniques, an NB-IOT UE receiving an RRCConnectionRelease message, before transitioning to an RRC-idle state, exchanges a series of messages according to one of the following two message sequences:

sequence A-1, the UE receives an RRC Connection Release message (e.g., from a BS serving the UE) on the DL, and a polling bit of an RLC protocol data unit (PDU) conveying the message is not set, indicating that the UE should not send a layer 2 (L2) acknowledgment (ACK) of the RRC Connection Release message.

2. The UE sends a hybrid automatic retransmission request (HARQ) UL ACK of the RRC Connection Release message.

sequence B-1. The UE receives an RRC Release on the DL, and the polling bit of an RLC PDU conveying the message is set, indicating that the UE should send an L2 ACK of the RRC Connection Release message.

2. The UE sends a HARQ UL ACK of the RRC Connection Release message.

3. The UE waits for an NO grant to be received from the BS, granting transmission resources (e.g., time and frequency resources) for the UE to send an L2 ACK of the RRC Connection Release message.

4. After receiving the NO grant, the UE sends an RLC UL L2 ACK of the RRC Connection Release message.

In both cases (i.e., both message sequences above), the UE typically waits up to 10 seconds before transitioning to an idle (e.g., RRC-idle) state, because it is desirable for the UE to assure the UL transmission has been successful before transitioning to the idle state. Otherwise, if the BS does not receive an ACK of the RRC Connection Release message, the UE may enter the idle state while the BS is attempting to communicate with the UE via the RRC connection that the UE has released.

According to previously known techniques, since there is no physical HARQ indicator channel (PHICH) type of feedback in communications systems operating according NB-IoT standards (unlike LTE, which does use PHICH feedback), and the way a UE determines that a retransmission (e.g., a retransmission of a HARQ ACK or an L2 ACK) from the UE is to occur is by the UE receiving either a new Ni grant of transmission resources or an NO grant with a new data indicator (NDI) (e.g., a polling bit of an RLC PDU) not toggled (e.g., set), the UE is not able to determine if an ACK of the RRC Connection Release message has been successfully acknowledged. Thus, the UE may wait for up to ten seconds after the RRC Connection Release message has been received by the UE before transitioning to an idle state.

Waiting for a period after receiving an RRC Connection Release message without transitioning to an idle state may waste power of the UE, potentially negatively impacting battery life of the UE. Waiting for the period also has a potential to cause a desynchronization between a serving BS (e.g., an eNB) and a UE regarding a current state of the UE. For example, a BS can send an RRC Connection Release message to a UE and receive an ACK. In the example, the BS may receive data to send to the UE, determine that the UE is in an RRC-idle state, and page the UE in order to establish an RRC connection with the UE in order to deliver the data to the UE. However, the UE may be waiting to transition to the RRC-idle state, and thus the UE considers itself to still be in an RRC-connected state and does not decode any paging messages from the BS.

A UE operating according to certain aspects of the present disclosure may wait a reduced amount of time in a connected state after receiving an RRC Connection Release message, as compared to a UE operating according to previously known techniques.

Figure 11:
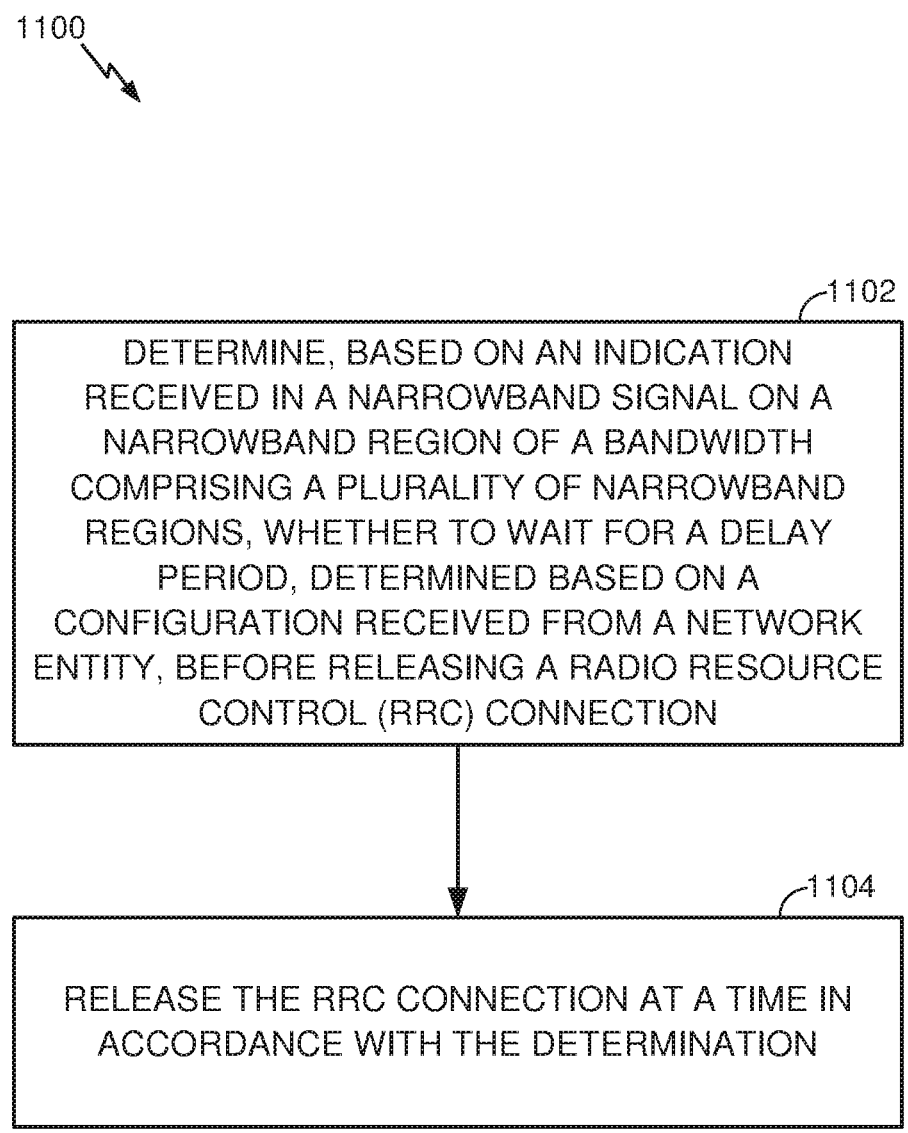
FIG. 11 is a flow diagram illustrating example operations for wireless communications by a UE, in accordance with certain aspects of the present disclosure.

FIG. 11 illustrates example operations 1100 for wireless communications, in accordance with certain aspects of the present disclosure. Operations 1100 may be performed, for example, by a UE (e.g., UE 120 shown in FIG. 1) operating in a narrowband region (e.g., 6 RB for eMTC or 1 RB for NB-IoT) of a bandwidth (e.g., an eMTC UE or NB-IoT UE).

Operations 1100 begin, at block 1102, by the UE determining, based on an indication received in a narrowband signal on a narrowband region of a bandwidth comprising a plurality of narrowband regions, whether to wait for a delay period, determined based on a configuration received from a network entity, before releasing a radio resource control (RRC) connection. For example, UE 120 (shown in FIG. 1) determines, based on an indication (e.g., a polling bit set in an RLC layer portion of an RLC PDU, as described in more detail below) received in a narrowband signal (e.g., an RRC Connection Release message from BS 110 in FIG. 1) on a narrowband region of a bandwidth comprising a plurality of narrowband regions (e.g., a narrowband within a wider system bandwidth) to wait for a delay period before releasing an RRC connection. In the example, the UE determines the delay period based on a configuration received from a network entity (e.g., based on an NPDCCH period configured on the UE by the BS), At block 1104, the UE releases the RRC connection at a time in accordance with the determination. Continuing the example from above, the UE releases the RRC connection to the BS after waiting for the delay period, in accordance with the determination made at block 1102.

In aspects of the present disclosure, once an RRC Connection Release message is received by a UE, if the RRC Connection Release message does not have a polling bit set at an RLC layer (i.e., a polling bit is not set in an RLC layer portion of an RLC PDU conveying the RRC Connection Release message), then the UE will send a HARQ ACK (e.g., via a PUSCH in format 2 (FMT-2)). The UE may then transition to an idle state (e.g., RRC-idle state) without waiting (e.g., as in previously known techniques), after a BS (e.g., an eNB) has sent an RRC Connection Release message (without a polling bit set at the RLC layer) and the UE has sent a HARQ ACK of the RRC Connection Release message. If the BS does not receive the HARQ ACK, the BS will retransmit the RRC Connection Release message. Effectively, after that, the BS may consider the UE to be released, so the UE can skip the steps of waiting to transition to the idle state and receiving the retransmission of the RRC Connection Release message, because the eventual connection state of the UE will be the same, and not waiting may conserve power of the UE.

According to aspects of the present disclosure, if a UE receives an RRC Connection Release message with a polling bit set at an RLC layer (i.e., a polling bit is set in an RLC PDU conveying the RRC Connection Release message) from a BS, the UE may send a HARQ ACK of the RRC Connection Release message. The BS may send an NO grant of transmission resources to the UE. The UE may use the transmission resources granted in the NO grant to send a layer 2 (L2) ACK of the RRC Connection Release message. The UE may then wait for X narrowband physical downlink control channel (NPDCCH) periods before the UE transitions to an idle state, where an NPDCCH period is a period for receiving an NPDCCH based on a current configuration of the UE where a downlink control information (DCI) conveying an NO grant can be sent by the BS indicating the UE should retransmit the L2 ACK and X is determined according to techniques described below. After the UE sends the L2 ACK, the UE continues to monitor for X valid NPDCCH periods, to check if the BS is requesting a retransmission of the L2 ACK. If the BS does not request a retransmission of the L2 ACK for X NPDCCH periods, then the UE may infer that the BS has received the L2 ACK successfully. If the BS does request a retransmission via an NO grant with no new data indicator (NDI) toggled (e.g., indicating that the BS is granting transmission resources for a retransmission), then the UE may retransmit the L2 ACK and wait for the X NPDCCH periods again. After waiting for the X NPDCCH periods without receiving an NO grant, the UE may transition to the idle state (e.g., RRC-idle).

In aspects of the present disclosure, if a BS transmits an RRC Connection Release message with a polling bit set at an RLC layer to a UE, receives a HARQ ACK of the RRC Connection Release message from the UE, sends an NO grant of transmission resources (e.g., resources for an L2 ACK of the RRC Connection Release message) to the UE, and receives a L2 ACK of the RRC Connection Release message from the UE, then the BS may determine that the UE should not wait to transition to the idle state. If the BS determines that the UE should not wait to transition to the idle state, the BS may transmit a new DCI comprising an NO grant with an NDI that is toggled (e.g., indicating that the grant is not for a retransmission) to the UE to indicate to the UE that the UE should transition to the idle state without waiting for a delay period (e.g., X NPDCCH periods).

According to aspects of the present disclosure, if a UE receives an RRC Connection Release message with a polling bit set at an RLC layer from a BS, sends a HARQ ACK of the RRC Connection Release message, receives an NO grant of transmission resources (e.g., resources to send an L2 ACK of the RRC Connection Release message), sends a L2 ACK of the RRC Connection Release message, and then receives a new DCI comprising an NO grant with an NDI that is toggled (e.g., indicating that the grant is not for a retransmission), the UE may make a new determination to not wait for a delay period and immediately transition to an idle state.

In aspects of the present disclosure, whether a BS sends an RRC Connection Release message with a polling bit set or unset at an RLC layer, a UE receiving the RRC Connection Release message may transition to an idle state in a period shorter than ten seconds (e.g., a few milliseconds) after a successful transmission of an UL packet as an ACK to RRC Connection Release.

According to aspects of the present disclosure, an 'NPDCCH period' refers to a period for receiving an NPDCCH, accounting for repetitions if a UE is configured to receive bundled NPDCCHs and not accounting for invalid subframes. That is, an 'NPDCCH period' may refer to a single subframe, which is a valid subframe for the UE to receive an NPDCCH (e.g., a downlink subframe in a TDD system), for a UE that is not configured to receive bundled NPDCCHs, while an 'NPDCCH period' for a UE that is configured to receive bundled NPDCCHs (e.g., the UE is configured for coverage enhancement) may be equal to a length of a bundled NPDCCH, excluding invalid subframes.

In aspects of the present disclosure, a UE may power down one or more radio components after releasing the RRC connection. For example, UE 120 (shown in FIG. 2) may receive an RRC Connection Release message from BS 110. In the example, after waiting for a period (as described above) and releasing the RRC connection, the UE may power down transmit processor 264.

According to aspects of the present disclosure, a number of NPDCCH periods for a UE to wait, X, before transitioning to an idle state after receiving and acknowledging an RRC Connection Release message with a polling bit set at an RLC layer may be determined based on a coverage (e.g., coverage enhancement (CE)) level of the UE. For example, a UE may select a value of X from a table of coverage levels and other factors that correspond to values of X.

Figure 12:
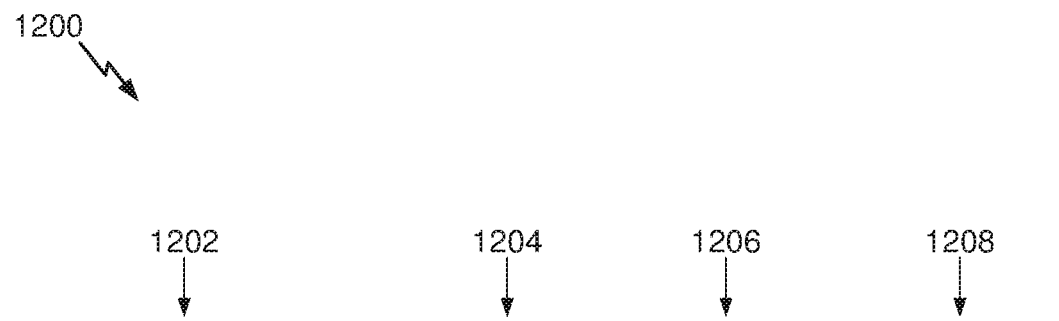
FIG. 12 is a table of coverage levels, reference signal strength indicator (RSSI) values, signal to interference ratio (SINR) values, and values of X, in accordance with aspects of the present disclosure.

FIG. 12 illustrates an exemplary table 1200 of coverage levels 1202, reference signal strength indicator (RSSI) values 1204, signal to interference ratio (SINR) values 1206, and values of X 1208, in accordance with aspects of the present disclosure. A UE (e.g., UE 120, shown in FIG. 1) that receives an RRC Connection Release message with a polling bit set at an RLC layer, sends a HARQ ACK of the RRC Connection Release message, receives an NO grant, and sends a L2 ACK of the RRC Connection Release message (e.g., as discussed previously) may consult the exemplary table to determine a value of X. If, for example, the UE is configured as being in a basic coverage level, the UE may determine that X=5. The UE may then wait for 5 NPDCCH periods before transitioning to an idle state.

According to aspects of the present disclosure, selection of a threshold value, X, by a UE may depend on a coverage level of the UE and/or other factors, as shown in the exemplary table 1200.

In aspects of the present disclosure, values of X increase as coverage levels of a UE increase, because as coverage levels increase, a probability of a UE failing to detect an NPDCCH intended for the UE (e.g., an NPDCCH allocating transmission resources for a DL transmission to the UE indicating that the UE should not transition to an idle state) also increases. For example, if a UE is in extreme coverage, a probability of failure for NPDCCH detection by the UE is increased as compared to the UE in normal coverage.

According to aspects of the present disclosure, a protocol stack of a UE may implement the methods and techniques described herein.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

For example, means for determining, means for performing, means for transmitting, means for communicating, means for receiving, means for sending, means for releasing, and/or means for signaling may include one or more processors, transmitters, receivers, and/or other elements of the user equipment 120 and/or the base station 110 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as hardware, software, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. One or more aforementioned devices or processors may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination thereof. A software module may reside in RAM memory, flash memory. ROM memory, EPROM memory. EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method for wireless communications by a user equipment (UE), comprising:
   determining, based on an indication received in a narrowband signal on a narrowband region of a bandwidth comprising a plurality of narrowband regions, whether to wait for a delay period, determined based on a configuration received from a network entity, before releasing a radio resource control (RRC) connection; and
   releasing the RRC connection at a time in accordance with the determination;
   wherein:
      the narrowband signal comprises a command to release the RRC connection;
      the indication comprises a set polling bit in a radio link control (RLC) layer portion of the narrowband signal;
      the determination is to wait for the delay period, based on the polling bit; and
      the method further comprises:
         sending a hybrid automatic retransmission request (HARQ) acknowledgment (ACK) of the narrowband signal prior to releasing the RRC connection;
         receiving a first downlink control information (DCI) comprising an N0 grant having a new data indicator (NDI) that is not toggled; and
         sending a layer 2 (L2) ACK of the narrowband signal, via transmission resources indicated in the N0 grant, prior to releasing the RRC connection.

2. The method of claim 1, wherein the indication is a first indication, the method further comprising:
   receiving a second indication comprising an unset polling bit in the RLC layer portion of the narrowband signal; and
   determining to not wait for the delay period.

3. The method of claim 2, further comprising:
   powering down one or more radio components of the UE subsequent to releasing the RRC connection.

4. The method of claim 1, further comprising:
   receiving a second DCI comprising a request for a retransmission of the L2 ACK; and
   retransmitting the L2 ACK prior to releasing the RRC connection.

5. The method of claim 1, further comprising:
   determining, based on a coverage level of the UE, a length of the delay period.

6. The method of claim 5, wherein the determining the length of the delay period comprises:
   determining a length of a narrowband physical downlink control channel (NPDCCH) period based on a number of repetitions determined based on the coverage level;
   determining a number of the NPDCCH periods based on the coverage level; and
   calculating the delay period as the determined number of the NPDCCH periods.

7. The method of claim 6, wherein determining the number of the NPDCCH periods comprises selecting the number from a table of coverage levels, based on the coverage level.

8. The method of claim 1, further comprising:
   receiving a second DCI comprising another NO grant having an NDI that is toggled; and
   making a new determination, to not wait for the delay period before releasing the RRC connection, in response to receiving the second DCI.

9. An apparatus for wireless communications, comprising:
   a processor configured to:
      determine, based on an indication received in a narrowband signal on a narrowband region of a bandwidth comprising a plurality of narrowband regions, whether to wait for a delay period, determined based on a configuration received from a network entity, before causing the apparatus to release a radio resource control (RRC) connection; and
      cause the apparatus to release the RRC connection at a time in accordance with the determination; and
   a memory coupled with the processor
   wherein:
      the narrowband signal comprises a command to release the RRC connection;
      the indication comprises a set polling bit in a radio link control (RLC) layer portion of the narrowband signal; and
      the processor is further configured to:
         determine to wait for the delay period, based on the polling bit;
         cause the apparatus to send a hybrid automatic retransmission request (HARQ) acknowledgment (ACK) of the narrowband signal prior to releasing the RRC connection;
         cause the apparatus to receive a first downlink control information (DCI) comprising an NO grant having a new data indicator (NDI) that is not toggled; and
         cause the apparatus to send a layer 2 (L2) ACK of the narrowband signal, via transmission resources indicated in the NO grant, prior to releasing the RRC connection.

10. The apparatus of claim 9, wherein the indication is a first indication, and the processor is configured to:
    receive a second indication comprising an unset polling bit in the RLC layer portion of the narrowband signal;
    determine to not wait for the delay period.

11. The apparatus of claim 10, wherein the processor is configured to:
    cause the apparatus to power down one or more radio components of the apparatus subsequent to releasing the RRC connection.

12. The apparatus of claim 9, wherein the processor is further configured to:
    cause the apparatus to receive a second DCI comprising a request for a retransmission of the L2 ACK; and
    cause the apparatus to retransmit the L2 ACK prior to releasing the RRC connection.

13. The apparatus of claim 9, wherein the processor is further configured to:
    determine, based on a coverage level of the UE, a length of the delay period.

14. The apparatus of claim 13, wherein the determining the length of the delay period comprises:
    determining a length of a narrowband physical downlink control channel (NPDCCH) period based on a number of repetitions determined based on the coverage level;
    determining a number of the NPDCCH periods based on the coverage level; and
    calculating the delay period as the determined number of the NPDCCH periods.

15. The apparatus of claim 13, wherein the processor is further configured to:
    cause the apparatus to receive a second DCI comprising another NO grant having an NDI that is toggled; and
    make a new determination, to not wait for the delay period before releasing the RRC connection, in response to receiving the second DCI.

16. The apparatus of claim 14, wherein the processor is configured to determine the number of the NPDCCH periods by selecting the number from a table of coverage levels, based on the coverage level.

17. An apparatus for wireless communications, comprising:
    means for determining, based on an indication received in a narrowband signal on a narrowband region of a bandwidth comprising a plurality of narrowband regions, whether to wait for a delay period, determined based on a configuration received from a network entity, before releasing a radio resource control (RRC) connection; and
    means for releasing the RRC connection at a time in accordance with the determination;
    wherein:
       the narrowband signal comprises a command to release the RRC connection;
       the indication comprises a set polling bit in a radio link control (RLC) layer portion of the narrowband signal;
       the determination is to wait for the delay period, based on the polling bit; and
       the apparatus further comprises:
          means for sending a hybrid automatic retransmission request (HARQ) acknowledgment (ACK) of the narrowband signal prior to releasing the RRC connection;
          means for receiving a first downlink control information (DCI) comprising an NO grant having a new data indicator (NDI) that is not toggled; and
          means for sending a layer 2 (L2) ACK of the narrowband signal, via transmission resources indicated in the NO grant, prior to releasing the RRC connection.

18. A computer-readable medium for wireless communications including instructions, the instructions, when executed by a processor, cause the processor to perform operations comprising:
    determining, based on an indication received in a narrowband signal on a narrowband region of a bandwidth comprising a plurality of narrowband regions, whether to wait for a delay period, determined based on a configuration received from a network entity, before releasing a radio resource control (RRC) connection; and releasing the RRC connection at a time in accordance with the determination;

wherein:
  the narrowband signal comprises a command to release the RRC connection;
  the indication comprises a set polling bit in a radio link control (RLC) layer portion of the narrowband signal;
  the determination is to wait for the delay period, based on the polling bit; and
  the operations further comprise:
    sending a hybrid automatic retransmission request (HARQ) acknowledgment (ACK) of the narrowband signal prior to releasing the RRC connection;
    receiving a first downlink control information (DCI) comprising an NO grant having a new data indicator (NDI) that is not toggled; and
    sending a layer 2 (L2) ACK of the narrowband signal, via transmission resources indicated in the NO grant, prior to releasing the RRC connection.

* * * * *